April 29, 1969   W. C. GAINES, JR   3,440,807
POCKET-TYPE FILTER CARTRIDGE AND SUPPORT STRUCTURE ASSEMBLY
Filed Feb. 1, 1966

INVENTOR.
William C. Gaines, Jr.
BY
Ralph B. Brick

United States Patent Office 3,440,807
Patented Apr. 29, 1969

3,440,807
POCKET-TYPE FILTER CARTRIDGE AND SUPPORT STRUCTURE ASSEMBLY
William C. Gaines, Jr., Louisville, Ky., assignor to American Air Filter Company, Inc., Louisville, Ky., a corporation of Delaware
Continuation-in-part of application Ser. No. 450,132, Apr. 22, 1965. This application Feb. 1, 1966, Ser. No. 524,190
Int. Cl. B01d 27/06
U.S. Cl. 55—497     11 Claims

ABSTRACT OF THE DISCLOSURE

A pocket-type filter including filter pleat means formed to provide a honeycomb of side-by-side filter pockets, the filter pleat means having a configuration in collapsed position which permits the mouth thereof to extend in preselected catenary-like shape when the filter pleat is in the expanded position and an arrangement is provided along the edges of the filter pleat means which is expansible to permit the peripheral edges of the filter pleat means to substantially coextend in the common plane of preselected catenary-like shape.

---

The present invention relates to fluid filters, and more particularly, to improved, high-efficiency, pocket-type air filter cartridges and support housings therefor. This application constitutes a continuation-in-part of application Ser. No. 450,132, filed Apr. 22, 1965, assignee, American Air Filter Company, Inc. now U.S. Patent No. 3,386,232.

As has been set forth previously in the aforementioned parent application, various arrangements for presenting maximum filter medium in a given air-treating space are known in the art, including pocket-type filters comprised of tubular bags or socks supported in cantilever fashion in the air stream to be treated. In some of these arrangements, individual securing mechanisms have been required for each bag or sock to properly support the same in the air stream, such individual securing mechanisms necessarily being costly in construction, erection, operation and maintenance. A number of pocket-type filter arrangements recently have been introduced to eliminate the need for individual securing mechanisms for each of the individual bags. For the most part, these arrangements have required comparatively complex, bulky, and difficult-to-assemble header mechanisms to support the pocket member in open position. In addition, these arrangements frequently have required complex suspension structures to hold the pocket members in appropriately suspended position along the path of the air stream. Further, these past arrangements have included support mechanisms which have offered substantial resistance to the flow of the treated air stream and which have not always permitted the pocket members to open in such a manner as to be free of contact with those members immediately adjacent thereto.

The present invention provides a further straightforward and economical pocket-type filter cartridge arrangement which avoids the disadvantages inherent with past arrangements. In accordance with the present invention, a pocket-type filter cartridge arrangement of predetermined configuration is provided, along with a corresponding support frame which conforms with the predetermined configuration, the cartridge being readily and efficiently assemblable from collapsed position into expanded position to provide a maximum of face opening and a maximum of filter medium to an air stream to be treated with a minimum resistance to flow thereto and a minimum of stress to the filter assembly. Further, the present invention provides a readily storable filter unit assembly which can be rapidly and economically installed in a support housing specifically adapted to receive the cartridge in firm sealing engagement therewith. In addition, the present invention provides a pocket-type filter cartridge arrangement and support housing structure which is sturdy in construction and which minimizes the possibilities of gas stream bypass.

Various other features of the present invention will become obvious to one skilled in the art upon reading the disclosure set forth hereinafter.

More particularly, the present invention provides a pocket-type fluid filter assembly comprising: filter pleat means longitudinally extendable in open-mouth fashion along the line of flow of a fluid stream to be treated, the filter pleat means having a configuration in collapsed position which permits the mouth thereof to extend in preselected common plane of catenary-like shape when the filter pleat is expanded; tuck means provided in preselected spaced relationship along opposite edges of said filter pleat means when said filter pleat means is expanded to permit the peripheral edges of said filter pleat means to substantially co-extend in the common plane of preselected catenary-like shape; and a flow-through, open-end support housing adapted to receive and support the filter pleat means when it is in expanded condition, the support housing having an upstream leading edge extending substantially in a common plane of preselected catenary-like shape conforming with the catenary-like shape of the mouth of the filter pleat means when in expanded condition to engage in sealed relationship with the support skirt of the filter pleat means.

It is to be understood that various changes can be made in the arrangement, form and construction of the apparatus disclosed herein without departing from the scope or spirit of the present invention.

Referring to the drawings.

Figure 4:
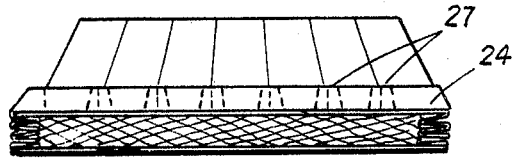
FIGURE 4 is an isometric plan view of the assembled pleats of FIGURES 2 and 3, in collapsed condition, disclosing a border frame support member attached in skirt form to the assembled pleats.

Referring to FIGURES 1 to 4 of the drawings, flow-through, open-end housing 1 and pocket-type filter cartridge 2 to be supported in housing 1 of the present invention are disclosed. Pocket-type filter cartridge 2 can be formed from any one of a number of known, suitable filter materials. For example, a porous filter paper material in single sheet or laminated form can be utilized, as can a woven or nonwoven fabric or fibrous glass type material. If desired, the filter medium can be faced with a suitable scrim backing to improve filter tensile strength and enhance pocket support in the air stream to be treated. To form pocket-type filter 2, two filter medium pleat sets 3 and 4 are utilized with the pleats of the two sets arranged in side-by-side alternating parallel relationship. Each of the pleats of set 3 (FIGURE 2) includes a pair of pleat-forming sections 6 of filter medium of a suitable type. It is to be understood that although only one such pleat section 6 of a pair is disclosed in FIGURE 2 of the drawings, the other section of such pair is substantially identical in configuration, and to form a pleat of set 3, can be placed in faced relation with disclosed section 6 for seaming together with such section along downstream common line 7 and along spaced side seams 8 and 9 which extend transverse line 7. It further is to be understood that the two pleat sections which form a pleat can be made from a suitable symmetrically-shaped single integral blank folded about common line 7 so that the integral sections face each other to form a pleat of the set.

In addition seams 8 and 9 extending along the sides of a pleat of set 3, each pleat of set 3 is provided with spaced seams 11 intermediate to side seams 8 and 9 and transverse to common line 7, to further join facing sections 6 of the pleat so as to form a plurality of open-mouth pocket members in the pleat. It is to be noted that each seam 11 is provided with tapered dart configuration 12. Each dart 12 has a lateral breadth at its intermediate portion greater than at its extremities, the dart extending from mouth-forming edge 13 of pleat 3 toward line 7 a suitably selected distance somewhere in the range of approximately one fourth the total distance between edge 13 and line 7 and the over-all total distance. Advantageously, darts 12 are arranged to extend approximately five seventh of the total distance between edge 13 and line 7. It is to be understood that the present invention is not limited to the specific dart arrangement nor to the specific filter pocket configuration aforedescribed. If desired, other suitable type filter configurations like that disclosed in the aforementioned copending application can also be used.

Each of the pleats of set 4 (FIGURE 3) includes a pair of pleat-forming sections 16 of filter medium. As with the pleats of set 3 aforedescribed, it is to be understood that although only one such section 16 of a pair is disclosed in FIGURE 3 of the drawings, the other section of such pair is substantially identical in configuration, and to form a pleat, can be placed in faced relationship with the disclosed section for seaming together with such section along downstream common line 17 and spaced side seams 18 and 19 which extend transverse to line 17. It further is to be understood that the two sections 16 comprising a pleat of set 4 can be formed from a suitably symmetrically-shaped single integral blank folded about common line 17 so that the integral sections face each other to form a pleat of the set.

In addition to side seams 18 and 19 extending along the sides of a pleat of the set 4, each pleat of set 4 is provided with spaced seams 21 intermediate to side seams 18 and 19 and transverse common line 17 to further join facing sections 16 of the pleat and form a plurality of open-mouth pocket members in the pleat. Like pleat set 3, it is to be noted that each seam 21 is provided with tapered dart configuration 22. Each dart 22 has a lateral breadth at its intermediate portion greater than at its extremities, the dart extending from mouth-forming edge 23 of pleat 4 toward line 17 a suitable selected distance somewhere in the range of approximately one fourth the total distance between edge 23 and line 17 and the over-all total distance. Advantageously, darts 22 are arranged to extend approximately five sevenths of the total distance between edge 23 and line 17.

Figure 1:
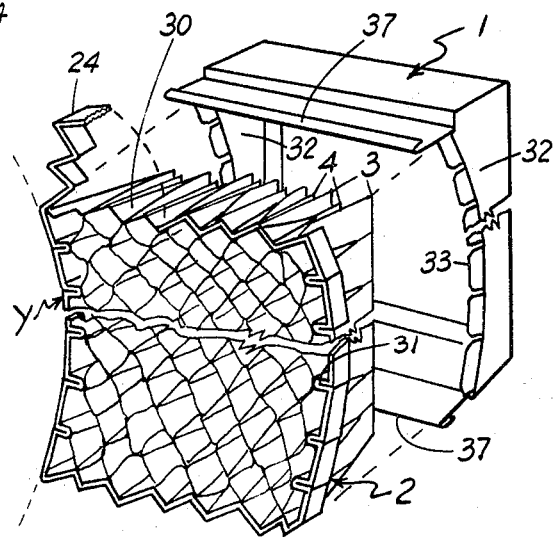
FIGURE 1 is an isometric, exploded view of a pocket-type filter cartridge in a support housing incorporating the features of the present invention.
Figure 2:
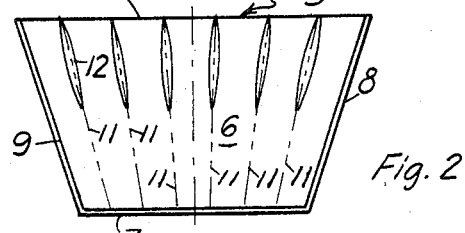
FIGURE 2 is a plan view of a pleat section of one of the pleats of one pleat set of the two pleat sets which can be embodied in the filter unit of FIGURE 1.
Figure 3:
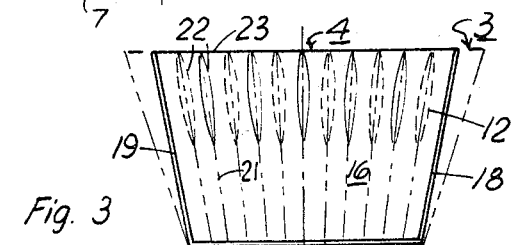
FIGURE 3 is a plan view of a pleat section of one of the pleats of the other pleat set of the two pleat sets which can be embodied in the filter unit of FIGURE 1, the phantom lines in this figure indicating the relative position of an adjacent pleat of the other pleat set upon assembly.
Figure 6:
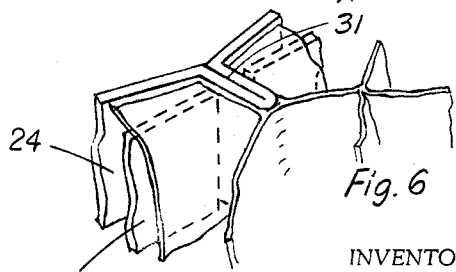
FIGURE 6 is an enlarged, isometric view of a portion of an expanded filter pleat cartridge adjacent a tuck portion in engagement with a slotted portion of the support housing.

It is to be noted that the formed pleats of set 3 (FIGURE 2) and those of set 4 (FIGURE 3) can be of trapezoidal configuration with the mouth-forming edges 13 and 23 having a greater breadth than the common lines 7 and 17, respectively. With such a trapezoidal configuration, each o fthe pocket-forming pleats of sets 3 and 4 takes on a tapered shape when assembled and placed in open position with the pleats tapering inwardly from mouth to downstream end in a plane perpendicular to the general plane of the pleat that lies intermediate the pleat sections. This tapered shape serves to reduce the possibilities of pleat contact and to enhance air flow between the pleats. In addition, tapered darts 12 and 22 adjacent the mouth portions of the pockets of pleat sets 3 and 4 serve to gather the filter medium adjacent the mouths of the pockets of each pleat to further reduce the possibilities of adjacent pleat and pocket contact and to further enhance air flow through the unit filter. Furthermore, it is to be noted that spaced seams 11 and 21 converge toward the common lines 7 and 17, respectively, when the pleats are in collapsed position (FIGURES 2 and 3). Accordingly, when the pleats are in open or extended position (FIGURE 1), each pocket member of each individual pleat, like the pleat itself, takes on a tapered shape with each pocket tapering inwardly from mouth to downstream end in a plane perpendicular to the general plane of the pleat intermediate the pleat sections as in the aforementioned application. Thus, a tapered shape which reduces pleat contact and enhances air flow is arrived at for each individual pocket as well as the pleat in an expedient and economical manner. In addition to the novel tapering arrangement aforedescribed, it is to be noted that mouth-forming edges 13 and 23 are straight. Accordingly, in the embodiment of the invention as set forth in FIGURES 1 to 6 of the drawings, when the pleats of the filter cartridge are extended to open position, the plane determining the mouth portion of the cartridge as it extends between end seams 8, 9 and 18, 19 is catenary-like in shape, attention being directed to dotted line Y of FIGURE 1. This catenary-like shape serves to minimize the structural tension stresses on the filter medium when it is placed in the air stream for fluid-treating operations, eliminating rigid support members intermediate the several pleats which would create additional resistance to the air stream and which might otherwise be required when the media is of flexible nature. At the same time, due to the offsetting of the pocket mouths which produces the honeycomb-like arrangement, a maximum of face opening is presented to the air stream to be treated. As aforenoted, it is to be understood that the present invention is not limited to the specific pleat form aforedescribed, nor is it limited to the specific dart arrangement aforedescribed for such pleats.

In assembling the pleats of sets 3 and 4 to form pocket-type filter member 2, the pleats of the set are arranged in alternating parallel, side-by-side relationship. In this connection, it is to be noted that seams 7 and 17 of sets 3 and 4, respectively, are of substantially the same breadth, whereas edges 13 of set 3 are of greater breadth than edges 23 of set 4, with pleat set 3 having one more seam and thus one more pocket-forming member than pleat set 4. It also is to be noted that pocket-forming seams 11 of set 3 are laterally offset from pocket-forming seams 21 of set 4 when the pleat sets are assembled as a unit. Since the breadth of the two sets differ assuming the sets are properly aligned in alternating relationship, when the pockets are expanded, a block-like shaped unit form (FIGURE 1) can be obtained by folding over a portion of the end pockets of the pleats of greater breadth as at 30. Once the pleats of the two sets are properly positioned in side-by-side, parallel alternating relationship, adjacent pleat sections 6 and 16 of the alternating pleats of the two pleat sets are joined together along the mouth-forming edges 13 and 23 only. When this has been accomplished, a pocket-type filter cartridge, collapsible in nature for ready storage and shipment has been formed in accordance with the precepts of the copending application aforedescribed. As aforestated, it is to be understood that any one of a number of known means can be used to form the seams of the pleats and pockets and to join the adjacent pleats of the sets. For example, heat sealing, sticthing, stapling, or gluing can be used.

Figure 5:
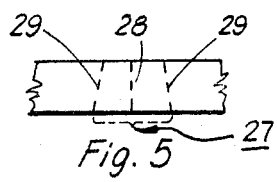
FIGURE 5 is an enlarged plan view of a portion of the border frame support member surrounding the filter pleat cartridge of FIGURE 4, disclosing in detail a set of fold lines of such border frame member.
Figure 7:
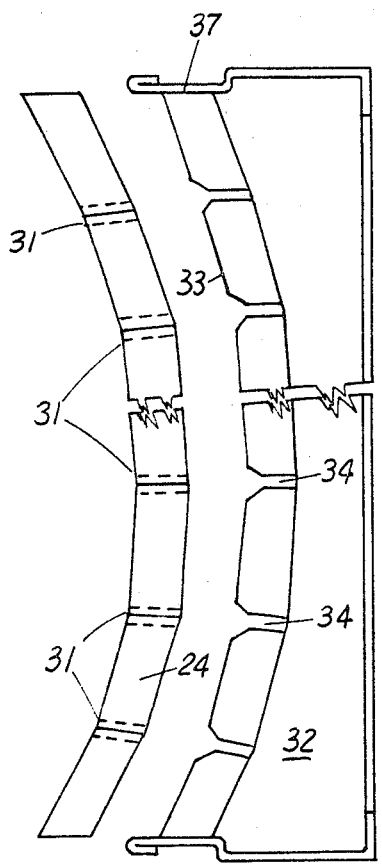
FIGURE 7 is an enlarged broken side view in schematic form disclosing the manner in which the border frame skirt is aligned with the slots of the support housing for insertion of the filter pleat cartridge.

In accordance with the present invention, once the cartridge has been formed, a suitable border frame member 24 of distortable nature is provided around the cartridge. This border frame member can be a strip of stiff, foldable material and advantageously, a suitable heavy cardboard can be utilized. As can be seen in FIGURE 1 of the drawing, the border frame member is sized to extend around the entire periphery of the filter cartridge. In accordance with the present invention, border frame member 24 is provided with fold lines arranged to permit the leading edge of the frame member to conform to the preselected catenary-like shape of the pleat mouths when the filter pleat cartridge is expanded. These fold lines are in the form of spaced sets 27 of tuck-forming units, with the sets of fold lines being spaced in such a manner as to be disposed adjacent the pocket-forming seams of the outer pleats of the filter pleat cartridge. As can be seen in FIGURES 4 and 5, each set of fold lines 27 includes an intermediate fold line 28 extending in normal fashion between the leading and trailing edges of the support skirt member 24 and further includes a pair of spaced, oppositely disposed fold lines 29 positioned on either side of the intermediate fold line 28 and extending in symmetrical converging fashion toward each other between the leading upstream edge of the border frame member and the trailing downstream edge thereof. It is to be noted that the border frame member 24 can be fastened to the filter pleat cartridge only along the edge of the mouth portion, this permits the opposite edge of the border frame member to be free with the border frame member serving as a border frame skirt. When the filter pleat cartridge is in collapsed position, the border frame edges are substantially in a straight line with the fold lines taking on the sloped position as aforedescribed (FIGURES 4 and 5). When the filter cartridge is in expanded position, the portions on either side of the intermediate fold line 28 bounded by fold lines 29 are positioned in facing relationship with each other to form tucks 31. As can be seen in FIGURE 7 of the drawing, such an arrangement results in the disappearance of the straight line form of the leading edge of the border frame member because of the sloping, converging lines 29 on either side of the intermediate lines 28 of the folds, the border frame edge taking on a catenary-like contour which conforms with the catenary-like contour of the filter blank cartridge. Once the filter blank cartridge is in expanded condition with the tucks 31 formed from the border frame member, the cartridge is ready for insertion in support housing 1. It is to be noted that two opposite sides 32 of support housing 1 are provided with upstream edge portions 33 which also are of catenary-like shape, conforming with the catenary-like shape of the cartridge. Edges 33 are provided with slots 34 sized and positioned to accommodate in nesting engagement therewith tucks 31 which form the catenary portions of the border frame skirt. It only is necessary to insert tucks 31 into slots 34 to mount the filter cartridge 2 in firm, stable engagement with structure housing 2. The other two opposite sides of the filter cartridge are fitted over the straight-edge portion 37 of housing 2 so as to be in sealing engagement therewith.

It is to be understood that in accordance with one embodiment of the invention, the tuck-forming sets 27 of the border frame member 24 can be eliminated. In such a situation, the peripheral edges of the media itself can be tucekd and glued together adjacent the pocket-forming seams of the outer pleats when the cartridge is expanded to provide a peripheral edge which takes on a catenary form substantially within a common plane with the mouths of the pleats. Suitable flat border frames can then be attached to the edge portions of the cartridge.

From the foregoing description, it can be readily seen that a novel support skirt arrangement is provided which insures ready mounting in an economical and straightforward manner of the filter cartridge in a structural support housing, and at the same time, substantially minimizes any gas passages around the fluid path defined by such housing.

The invention claimed is:

1. A pocket-type fluid filter comprising: filter pleat means including faced sheets of filter media selectively seamed together to provide a honeycomb of side-by-side pockets having adjacent mouth portions, said pockets being longitudinally extendable in open-mouth fashion along the line of flow of a fluid stream to be treated, said filter pleat means having a trapezoidal configuration with a substantially straight line mouth-forming edge in collapsed position which permits the mouth thereof to extend in a preselceted common plane of catenary-like shape when said filter pleat is expanded; and a peripheral border frame support member fixed to said filter pleat means along the peripheral edge of the mouth portion thereof, said border frame support member being of distortable expansible construction to be changeable between a first position and a second position to conform with said filter pleat means in collapsed position and to conform and to extend in a substantially common plane of preselected catenary-like shape when said filter pleat is expanded.

2. The apparatus of claim 1, said peripheral border frame support member being of stiff, foldable material and having fold lines arranged to permit the leading edge of said frame member to conform to the preselected catenary-like shape when said filter pleat means is expanded.

3. The apparatus of claim 2, said fold lines being arranged to provide a border frame support member of rectangular cross section transverse the direction of fluid flow when said filter pleat means is expanded.

4. The apparatus of claim 2, said fold lines on said border frame support member comprising sets of tuck-forming fold lines disposed on opposite sides of said border frame member, each of said sets including an intermediate fold line and a pair of oppositely disposed fold lines on either side of said intermediate fold line extending in sloping fashion toward each other between the leading upstream edge of said border frame support member and the trailing downstream edge thereof to provide fold tucks which permit said leading upstream edge to conform to said preselected catenary-like shape when said filter pleat means is expanded.

5. The apparatus of claim 4, said intermediate fold line of said tuck-forming fold lines extending in normal fashion between said leading and trailing edges of said border frame support member.

6. The apparatus of claim 4, said pair of oppositely disposed fold lines of each set being of symmetrical disposition with respect to their intermediate fold line to provide a border frame support member of rectangular cross section transverse the direction of fluid flow when said filter pleat means is expanded.

7. A pocket-type fluid filter assembly comprising: filter pleat means including faced sheets of filter media selectively seamed together to provide a honeycomb of side-by-side pockets having adjacent mouth portions, said pockets being longitudinally extendable in open-mouth fashion along the line of flow of a fluid stream to be treated, said filter pleat means having a trapezoidal configuration with a substantially straight line mouth-forming edge in collapsed position which permits the mouth thereof to extend in a preselected common plane of catenary-like shape when said filter pleat is explained; a peripheral border frame support member having one edge thereof fixed to said filter pleat means along the peripheral edge of the mouth portion thereof with the opposite edge free to provide a support skirt, said border frame support skirt being of distortable expansible construction to be changeable between a first position and a second position to conform with said filter pleat means in collapsed position and to conform and to extend in a common plane of preselected catenary-like shape when said filter pleat means is expanded; and a flow-through, open-end support housing adapted to receive and support said filter pleat means when in expanded condition, said support housing having an upstream leading edge extending substantially in a common plane of preselected catenary-like shape conforming with the catenary-like shape of the mouth of said filter pleat means when in expanded condition to engage in sealed relation with the support skirt of said filter pleat means.

8. The apparatus of claim 7, said peripheral border frame support skirt being of stiff, foldable material with fold lines arranged to permit the leading edge of said skirt to foldably conform to the preselected catenary-like shape when said filter pleat means is expanded; said support housing being provided with means to accommodate said folded portions of said support skirt.

9. The apparatus of claim 8, said fold lines on said border frame support skirt comprising at least one set of tuck-forming fold lines disposed on opposite sides of said border frame skirt, each of said sets including an intermediate fold line and a pair of oppositely disposed fold lines on either side of said intermediate fold line extending in sloping fashion toward each other between the leading upstream edge of said border frame support skirt and the trailing downstream edge thereof to provide fold tucks which permit said leading upstream edge to conform to said preselected catenary-like shape when said filter pleat means is expanded; said means to accommodate said folded tucks of said support skirt in said support housing comprising slots in the walls of said housing positioned and sized to receive said tucks in nesting engagement therewith.

10. A pocket-type fluid filter cartridge comprising: first and second filter pleat sets with the pleats of said sets positioned in alternating parallel side-by-side relationship, the pleats of each set including a pair of pleat-forming sections of filter medium joined together in end-to-end fashion along a common line and folded to face each other to form said pleat, said pleat having spaced seams extending transverse said common line to join said facing sections of said pleat and form a plurality of open-mouth pocket members; the seams of the pleats of one pleat set being laterally offset in relation to the seams of the pleats of the other pleat set with adjacent pleat sections of alternating pleats of the first and second pleat sets joined together at the mouth-forming portions thereof only to provide a honeycomb-like arrangement of fluid inlets when said filter pleat cartridge is placed in extended open position during fluid-treating operations; said filter pleat sets having a trapezoidal configuration with substantially straight line mouth-forming edges in collapsed position which permits the mouth thereof to extend in a preselected common plane of catenary-like shape when said filter pleat cartridge is expanded; and a peripheral border frame support member of stiff foldable material having the upstream edge thereof fixed to said filter pleat cartridge along the peripheral edge of the mouth portion of said cartridge with the downstream edge of said border frame support being free to provide a support skirt, said skirt being provided with spaced sets of tuck-forming fold lines, each set of fold lines being disposed adjacent a pocket-forming seam of said outer pleats of said filter pleat cartridge and including an intermediate fold line extending in normal fashion between said leading and trailing edges of said support skirt and a pair of oppositely disposed fold lines on either side of said intermediate fold line extending in symmetrical converging fashion toward each other between tthe leading upstream edge of said border skirt and the trailing downstream edge thereof to provide a tucked border frame support skirt of rectangular cross section transverse the direction of flow when said cartridge is expanded with the leading upstream edge of said skirt conforming with the catenary-like shape mouth of said filter pleat cartridge.

11. The apparatus of claim 10, and a flow-through, open-end, rectangular support housing to receive and support said filter pleat cartridge, said support housing having spaced slots in opposite wall portions thereof positioned and sized to receive said tucks of said support skirt of said cartridge in nesting engagement therewith.

References Cited

UNITED STATES PATENTS

| | | | |
|---|---|---|---|
| 2,502,560 | 4/1950 | Dahlman | 55—500 |
| 2,980,208 | 4/1961 | Neumann | 55—500 |
| 3,058,594 | 10/1962 | Hultgren | 210—493 |
| 3,087,623 | 4/1963 | Gewiss | 210—493 |
| 3,124,440 | 3/1964 | Hogg | 55—484 |
| 3,124,441 | 3/1964 | Rivers | 210—486 |
| 3,161,491 | 12/1964 | Gongoll et al. | 55—511 |
| 3,326,382 | 6/1967 | Bozek et al. | 210—484 |
| 3,360,120 | 12/1967 | Getzkin | 210—493 |

HARRY B. THORNTON, *Primary Examiner.*

BERNARD NOZICK, *Assistant Examiner.*

U.S. Cl. X.R.

55—521, 511; 210—493